United States Patent
Miao

(10) Patent No.: US 6,998,563 B1
(45) Date of Patent: Feb. 14, 2006

(54) CARBON NANOTUBE APPARATUS FOR SURFACE DISCHARGE POLISHING

(76) Inventor: Hsin-Yuan Miao, No. 16, Lane 124, Nanhe Road, Taichung 402 (TW)

( * ) Notice: Subject to any disclaimer, the term of this patent is extended or adjusted under 35 U.S.C. 154(b) by 0 days.

(21) Appl. No.: 11/066,304

(22) Filed: Feb. 28, 2005

(51) Int. Cl.
*B23H 1/02* (2006.01)
*B23H 1/06* (2006.01)

(52) U.S. Cl. .............................. 219/69.15; 219/69.13; 219/69.18

(58) Field of Classification Search ............ 219/69.15, 219/69.17, 69.13, 69.18; 977/DIG. 1
See application file for complete search history.

(56) References Cited

U.S. PATENT DOCUMENTS 3,927,293 A * 12/1975 Bell, Jr. .................. 219/69.13
4,324,969 A * 4/1982 Inoue ..................... 219/69.13
4,689,462 A * 8/1987 Goto ...................... 219/69.12
5,498,848 A * 3/1996 Wakabayashi et al. ... 219/69.17

FOREIGN PATENT DOCUMENTS

JP         8-108318 A   *   4/1996

* cited by examiner

Primary Examiner—Geoffrey S. Evans

(57) ABSTRACT

A carbon nanotube apparatus for surface discharge polishing using a transistor discharge circuit includes a signal generator having a integrated circuit for generating square wave; a photo coupler for isolating a cathode of the apparatus and an anode for processing; a discharge machining area comprising the anode for placing a target and the cathode having more than one multi-wall carbon nanotubes (MWCNT) grown on it. The apparatus uses the signal generator to control a waveform of square wave for electrical discharge machining and to control a current value for nanotube tips for electrical discharge machining, thus to enable the cathode of MWCNT apparatus for nanometer-level micro machining.

5 Claims, 8 Drawing Sheets

CARBON NANOTUBE APPARATUS FOR SURFACE DISCHARGE POLISHING

BACKGROUND OF THE INVENTION

1. Field of the Invention

The present invention relates to a carbon nanotube apparatus for surface discharge polishing, and more particularly to a transistor discharge circuit which can precisely control the energy in electrical discharge machining to achieve nanometer-level micro machining.

2. Description of the Prior Art

Since the introduction of carbon nanotube in the early 1990, there's been tremendous research enthusiasm regarding to this new material in its structure and its mechanical, thermal and electrical properties. According to various computer simulation analyses or experiments on single-wall carbon nanotubes (SWCNTs) or multi-wall carbon nanotubes (MWCNTs), it is well known that carbon nanotubes are of high rigidity, and are also good conductors of heat and electricity. Moreover, due to its high length-to-width ratio, it is viable to produce high electric field intensifying effect. Therefore, it is capable of providing electron field emission characteristics under low electric field.

At present, electrical discharge machining is based on the erosion mechanism of pulse discharge, wherein the tool and the target connected to two ends of pulse source respectively. Electrical discharge machining is different from electrochemical machining in that its electrode could be worn out, therefore careful selection of abrasion-resistive electrode material, proper electrode size and parameters of electrical discharge machining could reduce the worn-out effect on the precision of discharge machining.

However, recently there's been great improvements on micro electrical discharge machining, where researchers use etching or wire electric discharge guide on thin rod of 2 $\mu$m in diameter to manufacture tungsten electrode. The precision of discharge machining is then to be controlled by the size of the pre-built tungsten electrode. Hence, it is a revolutionary and innovative way in implementing micro-mechanical machining technology.

Although mechanical machining is nothing more than the forming and surface treatment processes, it is noted that, for example, in the surface treatment process, the nickel plate used in modern hard disk should have an average roughness (RA) of 120 nm and a storage volume of 80 Gb through CNC machining. In order to obtain a storage volume of 160 Gb, the average roughness should reduce to 50~70 mm, that is not viable under current techniques.

Therefore, the above-mentioned devices present several shortcomings to be overcome.

In view of the above-described deficiency of prior-art devices, after years of constant effort in research, the inventor of this invention has consequently developed and proposed a carbon nanotube apparatus for surface discharge polishing to achieve nanometer-level micro machining.

SUMMARY OF THE INVENTION

The present invention is to provide a transistor discharge circuit, which can precisely control the energy in electrical discharge machining to achieve nanometer-level micro machining.

Another, the present invention is to provide a carbon nanotube apparatus for surface discharge polishing, under suitable conditions, MWCNTs grown on alloy substrate using copper (Cu) as matrix can implement micro machining and provide a material remove rate of 30 nun/min in mechanical machining.

Still another, the present invention is to provide a carbon nanotube apparatus for surface discharge polishing, wherein more than one MWCNTs grown on the alloy substrate are of high rigidity.

The present invention discloses a carbon nanotube apparatus for surface discharge polishing comprises a transistor discharge circuit, wherein the circuit comprises a signal generator having an integrated circuit for generating square wave and using a transistor to control a external processing voltage to turn on and off to precisely control the energy in electrical discharge machining; a photo coupler for isolating a first electrode of the apparatus and a second electrode for processing to prevent a circuit comprising the first electrode from being damaged due to various factors; an electrical discharge machining area comprising: a cathode being the electrode having more than one carbon nanotubes grown on it; and an anode being the second electrode for placing a target fixed on the anode; a current limiting resistor for controlling a current value for carbon nanotube tips of the cathode for electrical discharge machining; and the signal generator to control the cathode for generating a waveform of square wave for electrical discharge machining and to control a current value for carbon nanotube tips for electrical discharge machining, thus to enable the cathode for nanometer-level micro machining.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
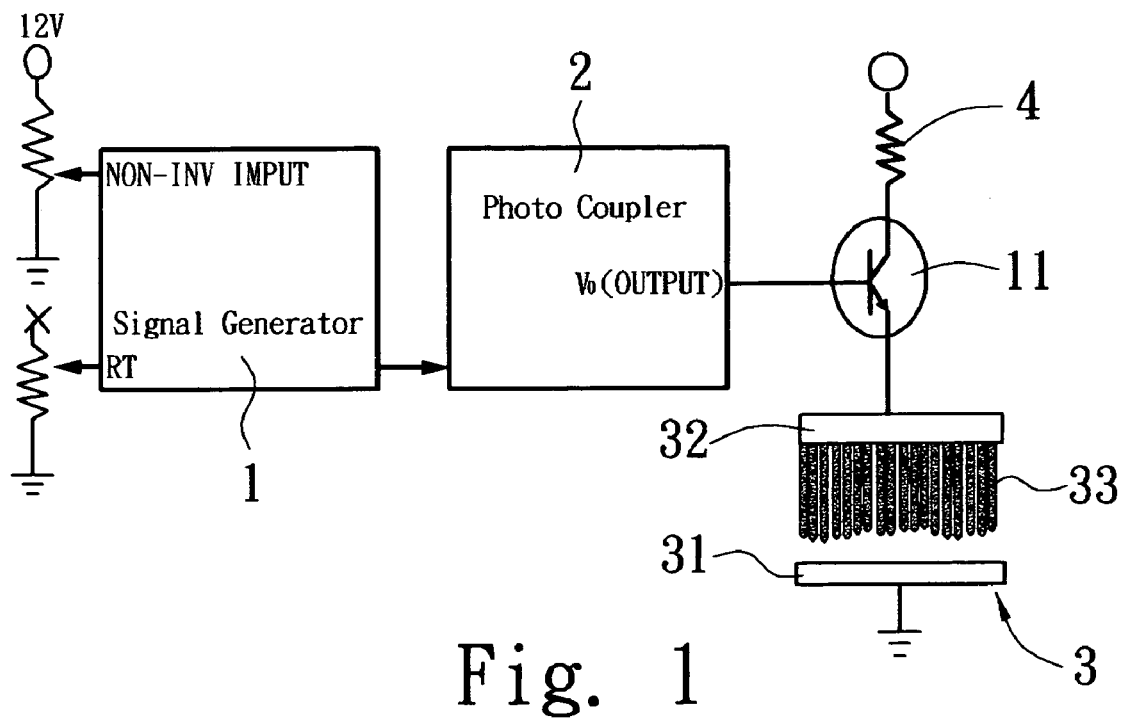
FIG. 1 is a diagram illustrating a carbon nanotube apparatus for surface discharge polishing comprises a transistor discharge circuit.
Figure 2:
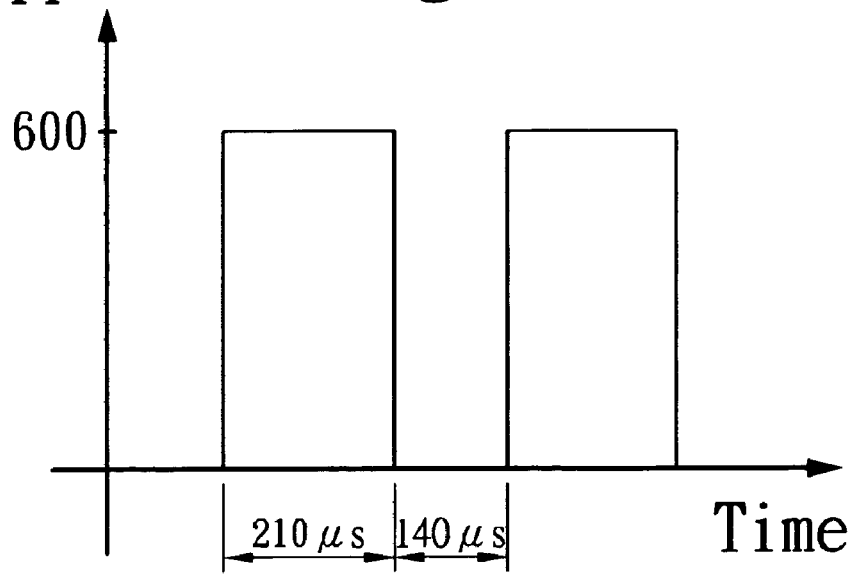
FIG. 2 is a timing diagram illustrating a carbon nanotube apparatus for surface discharge polishing comprises a transistor discharge circuit.

Please refer to FIGS. 1 to 15, the present invention discloses a carbon nanotube apparatus for surface discharge polishing comprises a transistor discharge circuit, wherein the circuit comprises a signal generator 1, a photo coupler 2, an electrical discharge machining area 3 and a current limiting resistor 4.

The signal generator 1 comprises an integrated circuit for generating square wave. In a preferred embodiment, the signal generator is a type SG3452 IC, using a transistor 11 of IRF 640 to control a external processing voltage to turn on and off to precisely control the energy in electrical discharge machining.

The photo coupler 2 is for isolating a first electrode 32 of the apparatus and a second electrode 31 for electrical discharge machining to prevent a circuit comprising the first electrode 32 from being damaged due to various factors. In a preferred embodiment, the photo coupler 2 is a type TLP250 photo coupler.

The electrical discharge machining area 3 comprises a cathode being the first electrode 32 having more than one multi-wall carbon nanotubes 33 grown on it, and an anode being the second electrode 31 for placing a target fixed on the anode.

The current limiting resistor 4 is for controlling a current value for multi-wall carbon nanotube tips 33 of the cathode for electrical discharge machining.

The signal generator 1 can control the cathode 32 for generating a waveform of square wave for electrical discharge machining and to control a current value for carbon nanotube tips 33 of the cathode 32 for electrical discharge machining, thus to enable the cathode 32 for nanometer-level micro machining.

The present invention uses copper alloy substrate to grow carbon nanotubes, comprising the following steps:
(a) melting a metal catalyst into a copper matrix to form a copper alloy substrate;
(b) using abrasive paper to grind the copper alloy substrate to form a reaction area on the surface of the copper alloy substrate;
(c) placing the copper alloy substrate onto the specimen holder of the chemical vapor deposition chamber containing RF-heated hot tungsten filament;
(d) using a tungsten filament to maintain the reaction temperature for the copper alloy substrate;
(e) using a microwave generator to pre-dissociate the reacting gas which is going to flow into the chamber;
(f) using a RF generator to produce a negative bias of −150V~−450 V;
(g) using Hydrogen etching to form nano-meter level catalyst particles in the reaction area; and
(h) forming carbon nanotubes 33 on the reaction area with carbon atoms.

In the carbon nanotubes 33 forming step, the reaction gas comprises diluted gas (Hydrogen) and carbon source (methane). At first, provide 80 sccm of diluted gas into the reaction chamber and heat the alloy substrate to 850~950° C. of reaction temperature by hot tungsten filaments, after the condition becoming stable for a period of time, using Hydrogen as the etching source, then conducting the carbon source. The carbon source conducting step comprises providing 30 sccm at first, then 10 sccm for every 2 minutes to reach 60 sccm, while allowing 20 minutes for carbon nanotubes to grow.

The present invention uses the anode 33 of the transistor discharge circuit to test a unpolished n-type Si Wafer in three different dielectrics, namely vacuum ($10^{-3}$-torr), normal atmosphere, and DI-water respectively to obtain the result of the transistor discharge circuit under different circumstances.

Figure 3:
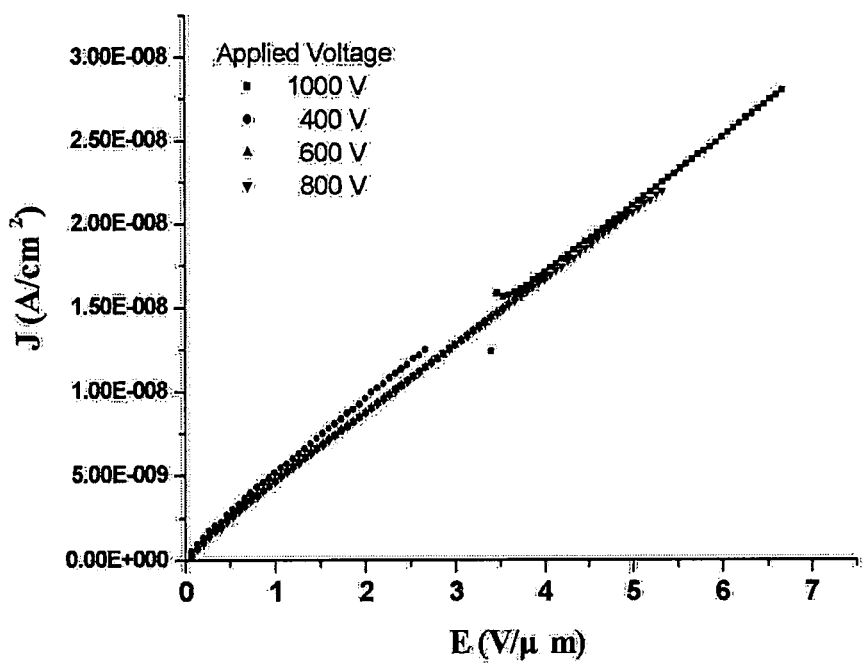
FIG. 3 is a voltage-to-current diagram illustrating leakage current of a carbon nanotube apparatus for surface discharge polishing, wherein its copper substrate does not comprise carbon nanotube.

A leakage current test is to be conducted on the cathode 32 first, the reason is that the cathode 32 will be treated by abrasive paper #1000 before MWCNTs 33 grown on it, so tiny scratches and tips are likely to form on its surface to cause leakage current when external electric field is exerted. FIG. 3 is a voltage-to-current diagram illustrating leakage current of the carbon nanotube apparatus.

From the above, it can be seen that under external electric field, the cathode 32 may generate leakage current. However, the leakage current density of 0.025 $\mu A/cm^2$ under a 1,000V exerted voltage is minimal compared with the real field emission current density of the carbon nanotubes 33, but the leakage current does exist.

Figure 4:
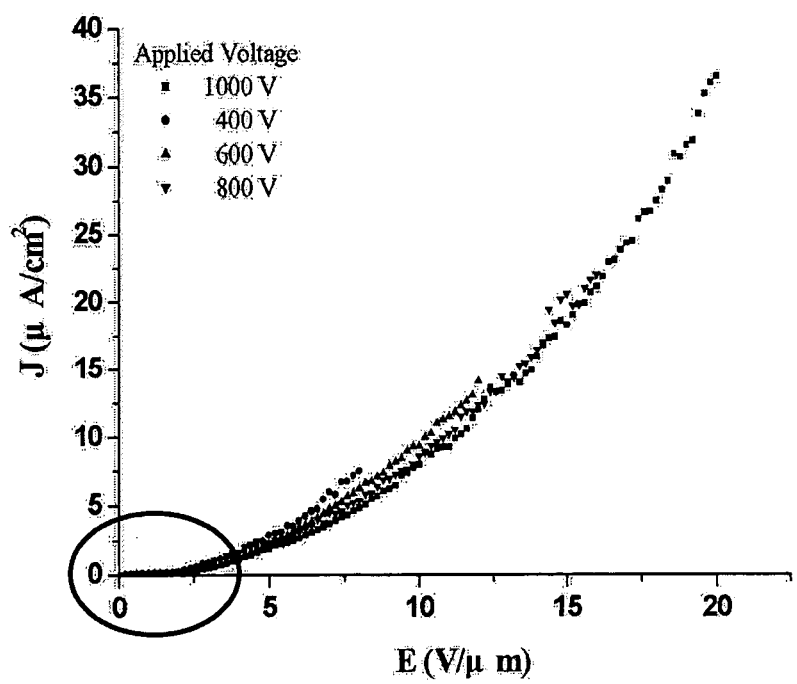
FIG. 4 is a voltage-to-current diagram illustrating field emission characteristics of a carbon nanotube apparatus for surface discharge polishing, wherein carbon nanotubes are grown on copper substrate.
Figure 5:
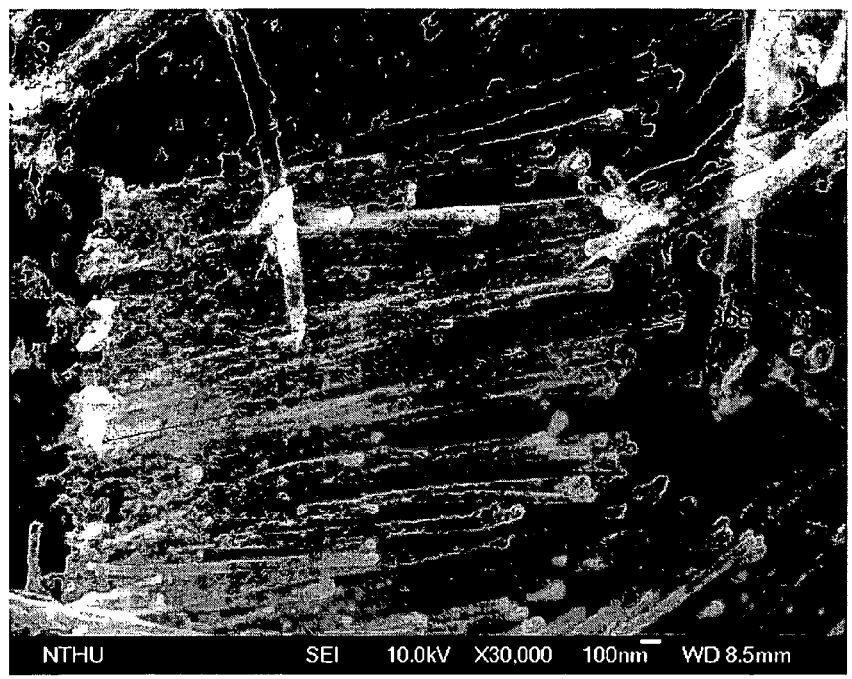
FIG. 5 is a diagram illustrating MWCNTs of a carbon nanotube apparatus for surface discharge polishing under electronic microscope.

Please refer to FIG. 4, which illustrates a field emission characteristics of the cathode 32 having large area of highly-collimated MWCNTs 33 grown on it. When the external voltage was exerted from 0 to 1,000V, it is shown that the initial voltage of MWCNTs 33 is about 2.5V/$\mu$m, which is smaller than that using Si wafer as alloy substrate, and also smaller than that using non-copper metal as alloy substrate. There are two factors contributed to this phenomenon: first, copper is good conductor, thus all the exerted voltage being able to be transferred to the tips of MWCNTs 33 with minimum energy loss; second, highly-collimated MWCNTs 33 providing high length-to-width ratio to further enhance the intensity of electric field.

Besides, MWCNTs 33 are rooted on the cathode 32, so each one of the MWCNTs 33 exhibits a certain robustness to enable repetitive tests without much variation in the resulting statistics. Therefore, after the tests were done, using a scanning electron microscope (not shown in figure) to observe the MWCNTs 33 grown on the cathode 32, it is shown that most of the MWCNTs 33 remained unchanged on the cathode 32 with little loss. Only MWCNTs 33 in the region under high pressure and friction force of the Teflon spacer show tumbling and overlapping phenomenon, however, none of the body of each one of the MWCNTs 33 were bent. Therefore the rigidity of MWCNTs 33 is shown, as in FIG. 5.

In addition, use the transistor discharge circuit as shown in FIG. 1 to carry out the process of electrical discharge machining with an external voltage of 600V and a reaction chamber (not shown in figure) having a pressure of $10^{-3}$ torr inside the chamber. In the meantime, control the waveform of the square wave used in the electrical discharge machining with a ratio of Ton (turn on) to Toff (turn off) to be 3:2, which is helpful for processing and waste removal concerns.

Figure 6:
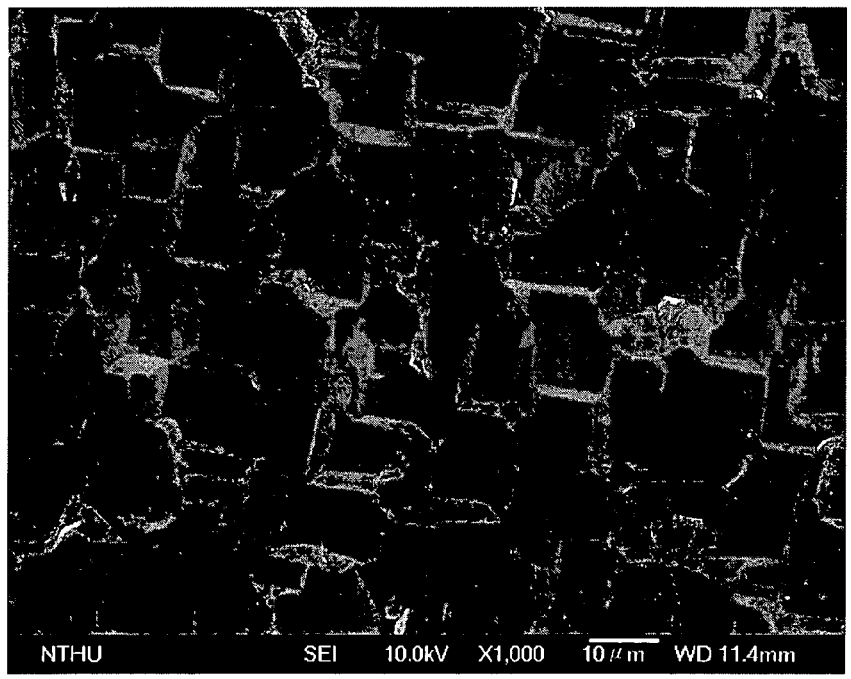
FIG. 6 is a diagram illustrating microscopic views of parts of a carbon nanotube apparatus for surface discharge polishing before processed by electrical discharge machining.
Figure 7:
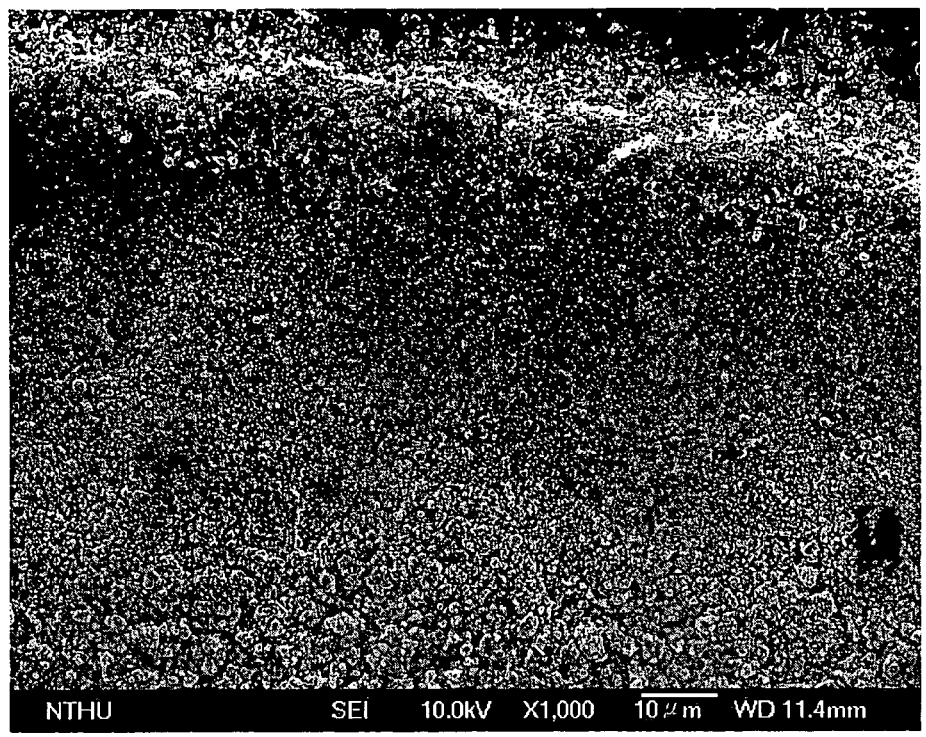
FIG. 7 is a diagram illustrating microscopic views of parts of a carbon nanotube apparatus for surface discharge polishing after processed by electrical discharge machining.

FIGS. 6 and 7 illustrate respectively a point on the anode 31 before and after being processed. Obviously the rough surface becomes much smoother, while the difference of the average roughness before processed and the average roughness after processed is about 600 nm, which means the average material remove rate is 30 nm/min. Hence, it is proved that under suitable conditions, it is viable to use MWCNTs 33 grown on the cathode 32 for electrical discharge machining.

Figure 8:
FIG. 8 is a diagram illustrating microscopic views of parts of a carbon nanotube apparatus for surface discharge polishing after processed by electrical discharge machining.

Besides, using scanning electron microscope to view the MWCNTs 33 of the cathode 32, as shown in FIG. 8, there are 4 different aspects presented by the MWCNTs 33, comprising:

(1) Area A 331, where high-power arc discharge evaporates the MWCNTs 33, no surface polishing was done and pits were left on the area A 331.

Figure 9:
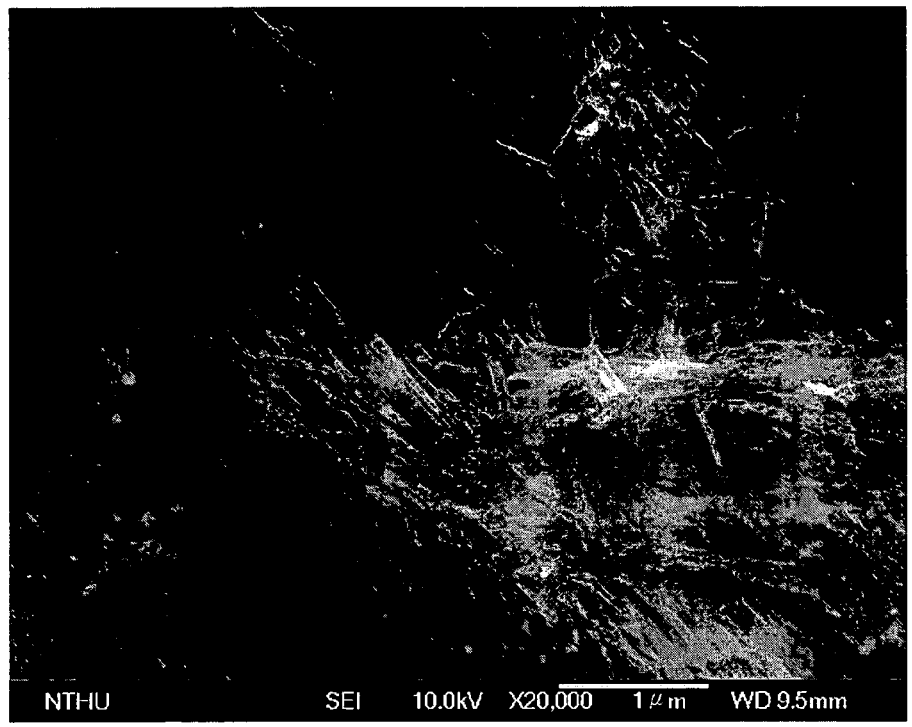
FIG. 9 is a diagram illustrating a first microscopic view of MWCNTs of a carbon nanotube apparatus for surface discharge polishing after processed by electrical discharge machining.

(2) Area B 332, where much of the electrical discharge machining was done. In this area, the MWCNTs 33 gradually become bleached starting from top to bottom, as shown in FIG. 9. When the situation becomes worse, the MWCNTs 33 could be evaporated from the surface of the cathode 32. However, it is different from that of Area A 331.

Figure 10:
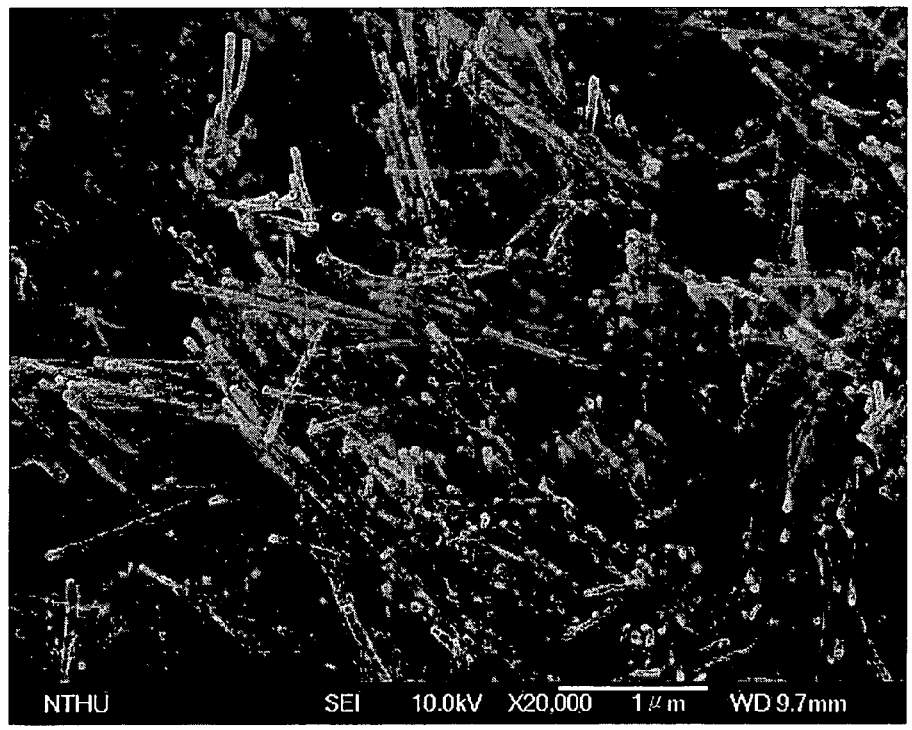
FIG. 10 is a diagram illustrating a second microscopic view of MWCNTs of a carbon nanotube apparatus for surface discharge polishing after processed by electrical discharge machining.

(3) Area C 333, where less of the electrical discharge machining was done. There is little change on the appearance of the MWCNTs 33 in the area, as shown in FIG. 10.

Figure 11:
FIG. 11 is a diagram illustrating a third microscopic view of MWCNTs of a carbon nanotube apparatus for surface discharge polishing after processed by electrical discharge machining.

(4) Area D 334, covered by the Teflon spacer and none of the electrical discharge machining was done here. It is shown that the MWCNTs 33 in this area tumble and overlap each other, however, none of the body of each one of the MWCNTs 33 were bent. This is shown in FIG. 11.

Figure 12:
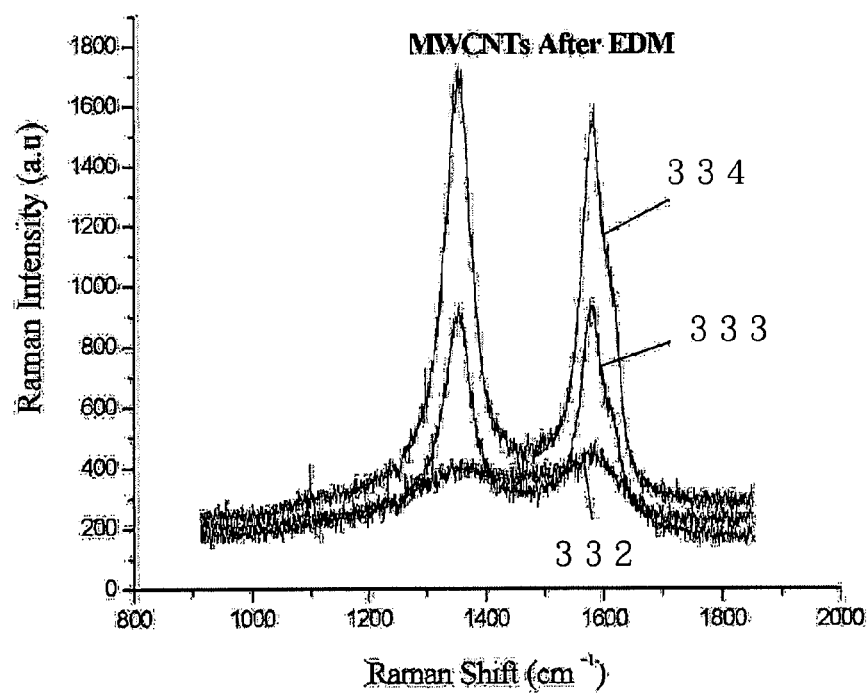
FIG. 12 is a Micro-Raman spectrogram illustrating MWCNTs of a carbon nanotube apparatus for surface discharge polishing after processed by electrical discharge machining.

In FIG. 12, a Micro-Raman spectroscopy is used to view the MWCNTs 33 after electrical discharge machining was done. It can be seen that in the area where the activities of electrical discharge machining are intense, both the peaks of G-band or D-band will gradually disappear, which means that high-power current undermines the $sp^2$ structures of carbon atoms to deteriorate graphite structure from top to bottom (i.e. the bleached phenomenon shown in FIG. 9). If the structure is totally deteriorated, then the MWCNT will disappear from the surface of the cathode 32.

When testing micro-electrical discharge machining under the normal atmosphere, humid air would make it hard for the MWCNTs 33 to use small external voltage to dissociate humid air so as to create arc discharge. If external voltage is to increase so as to create arc discharge, it could end up like Area A 331 in FIG. 8, where high current could produce high arc discharge to evaporate the cathode 32 along with its MWCNTs 33. Then the MWCNTs 33 would fail to perform micro-electrical discharge machining.

Technically speaking, there's still room for improvements, such as:

(1) Implement electrical discharge machining under dry air.

(2) Reduce the thickness of the Teflon spacer to less than 150 μm.

(3) Control the current value of the discharge circuit in a more precise way.

The above mentioned methods can achieve the object of using MWCNTs 33 to perform electrical discharge machining. Therefore, the precision of surface polishing is improved and the cost of electrical discharge machining is reduced.

Figure 13:
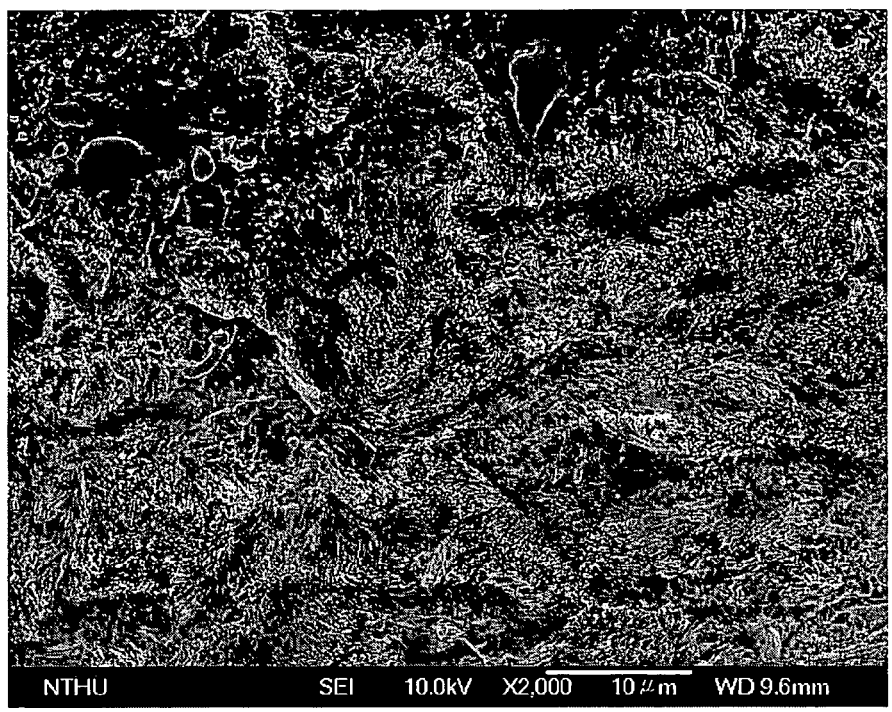
FIG. 13 is a diagram illustrating a microscopic view of MWCNTs of a carbon nanotube apparatus for surface discharge polishing after processed by micro-electrical discharge machining, wherein MWCNTs are processed using air as dielectric under low external voltage.

FIG. 13 shows that arc discharge under normal atmosphere could affect the highly collimated MWCNTs 33 to exhibit like victims after big explosion. Take a close look of FIG. 13, the explosion happens as the MWCNTs 33 being the explosion center, where the MWCNTs 33 tumble down either radially or spirally.

Figure 14:
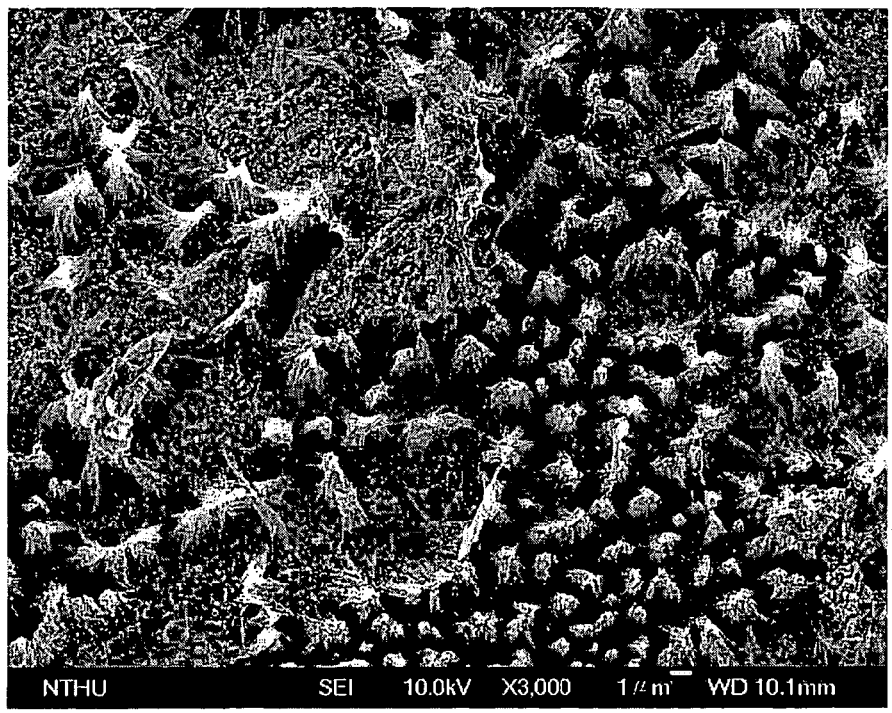
FIG. 14 is a diagram illustrating a microscopic view of MWCNTs of a carbon nanotube apparatus for surface discharge polishing after processed by micro-electrical discharge machining, wherein MWCNTs are processed using DI water as dielectric under low external voltage.
Figure 15:
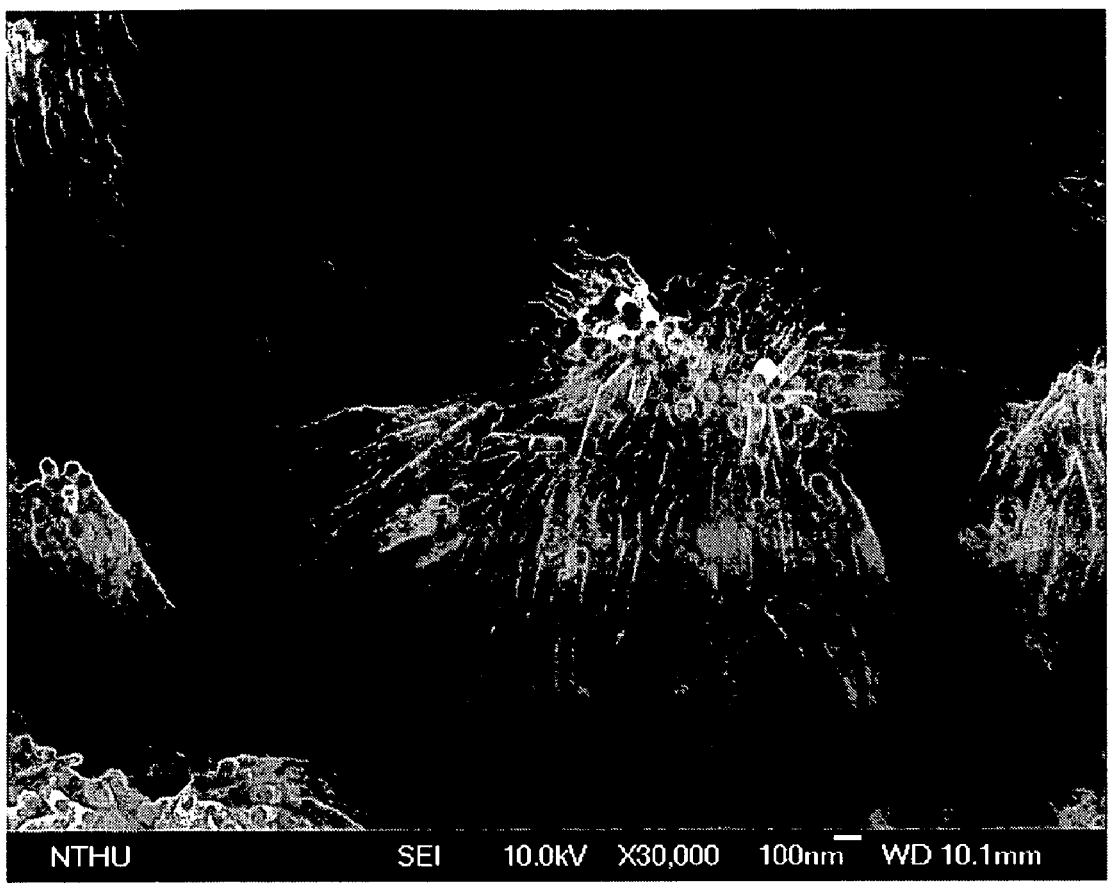
FIG. 15 is a diagram illustrating a microscopic view of a carbon nanotube apparatus for surface discharge polishing after processed by micro-electrical discharge machining using DI water as dielectric under low external voltage.

FIGS. 14 and 15 show the testing result of micro-electrical discharge machining under DI water. Since arc discharge will cause DI water to explode and to draw fluid flows to create whirlpool, which in turn drives the MWCNTs 33 and to have tips of the MWCNTs 33 brought together due to the turbulence of the whirlpool.

From above, the present invention discloses a transistor discharge circuit which can precisely control the energy in electrical discharge machining to achieve nanometer-level micro machining. Besides, using the MWCNTs 33 of the cathode 32 to test nanometer-level micro-electrical discharge machining, it is shown that, under suitable conditions, MWCNTs grown on alloy substrate using copper (Cu) as matrix can implement micro machining and provide a material remove rate of 30 nm/min in mechanical machining.

Besides, from the above experiments, it is observed that the MWCNTs 33 have different behaviors when placed in different dielectrics.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A carbon nanotube apparatus for surface discharge polishing comprising:
    a signal generator having an integrated circuit for generating square wave, the signal generator using a transistor to control a external processing voltage to turn on and off to precisely control the energy in electrical discharge machining;
    a photo coupler for isolating a first electrode of the apparatus and a second electrode for processing to prevent a circuit comprising the first electrode from being damaged due to various factors;
    an electrical discharge machining area comprising:
        a cathode being the first electrode having more than one carbon nanotubes grown on it; and
        an anode being the second electrode for placing a target fixed on the anode; and
    a current limiting resistor for controlling a current value for carbon nanotube tips of the cathode for electrical discharge machining;
    wherein the signal generator controls the cathode for generating a waveform of square wave for electrical discharge machining and to control a current value for carbon nanotube tips for electrical discharge machining, thus to enable the cathode for nanometer-level micro machining.

2. The carbon nanotube apparatus of claim 1, wherein the carbon nanotube is a multi-wall carbon nanotube (MWCNT).

3. The carbon nanotube apparatus of claim 1, wherein a diluting gas comprising hydrogen is used in electrical discharge machining.

4. The carbon nanotube apparatus of claim 1, wherein a carbon source comprising methane is used in electrical discharge machining.

5. The carbon nanotube apparatus of claim 1, wherein the cathode has more than one multi-wall carbon nanotubes (MWCNTs) grown on it.

* * * * *